(12) United States Patent
Maguire, Jr.

(10) Patent No.: US 6,411,266 B1
(45) Date of Patent: Jun. 25, 2002

(54) APPARATUS AND METHOD FOR PROVIDING IMAGES OF REAL AND VIRTUAL OBJECTS IN A HEAD MOUNTED DISPLAY

(76) Inventor: Francis J. Maguire, Jr., 33 Colby Dr., East Hartford, CT (US) 06108

( * ) Notice: Subject to any disclaimer, the term of this patent is extended or adjusted under 35 U.S.C. 154(b) by 1305 days.

(21) Appl. No.: 08/560,108

(22) Filed: Nov. 17, 1995

Related U.S. Application Data

(63) Continuation of application No. 08/109,919, filed on Aug. 23, 1993, now abandoned.

(51) Int. Cl.[7] .................................................. G09G 5/00
(52) U.S. Cl. .............................. 345/8; 348/53; 340/980
(58) Field of Search .............................. 348/373, 376, 348/53, 158, 838, 383, 578, 584, 586; 345/7, 8, 9; 340/980

(56) References Cited

U.S. PATENT DOCUMENTS

| | | | |
|---|---|---|---|
| 2,955,156 A | 10/1960 | Heilig | |
| 3,050,870 A | 8/1962 | Helig | |
| 3,113,180 A | 12/1963 | Bingley et al. | 348/206 |
| 3,234,327 A | 2/1966 | McMann | 358/494 |
| 3,336,587 A | 8/1967 | Brown | 345/20 |
| 3,507,988 A | 4/1970 | Holmes | 348/143 |
| 3,542,457 A | 11/1970 | Balding et al. | 351/7 |
| 3,576,945 A | 5/1971 | Eberling | 178/785 |
| 3,746,782 A | 7/1973 | Driskell | 348/586 |
| 3,850,511 A | 11/1974 | Merchant | 351/209 |
| 3,869,694 A | 3/1975 | Merchant et al. | 367/117 |
| 3,883,235 A | 5/1975 | Lynn et al. | 351/39 |
| 4,028,725 A | 6/1977 | Lewis | 356/158 |
| 4,034,401 A | 7/1977 | Mann | 33/262 |
| 4,109,145 A | 8/1978 | Graf | 345/146 |
| 4,189,744 A | 2/1980 | Stern | 348/577 |
| 4,209,255 A | 6/1980 | Heynau et al. | 345/8 |
| 4,246,605 A | 1/1981 | La Russa | 348/586 |
| 4,283,177 A | 8/1981 | Kron et al. | 434/59 |
| 4,303,394 A | 12/1981 | Berke et al. | 434/40 |
| 4,348,186 A | 9/1982 | Harvey et al. | 434/44 |
| 4,349,815 A | 9/1982 | Spooner | 345/8 |
| 4,405,943 A | 9/1983 | Kanaly | 348/399 |
| 4,513,317 A | 4/1985 | Ruoff, Jr. | 348/384 |
| 4,516,157 A | 5/1985 | Campbell | 388/158 |
| 4,559,555 A | 12/1985 | Schoolman | 348/53 |
| 4,757,380 A | 7/1988 | Smets et al. | 348/48 |

(List continued on next page.)

FOREIGN PATENT DOCUMENTS

| EP | 0330147 | 8/1989 |
| JP | 3292093 | 12/1991 |

OTHER PUBLICATIONS

"A head—mounted three dimensional display" Fall Joint Computer Conference, 1968 Ivan E. Sutherland pp. 75–763.*

T. Caudell et al, "Augmented Reality: An Application of Heads–Up Display Technology to Manual Manufacturing Processes", *Proc. Hawaii Int'l Conf. System Sciences*, pp. 659–669, Jan. 1992.

M. Deering, "High Resolution Virtual Reality", Computer Graphics (Proc. SIGGRAPH Conf.), vol. 26, No. 2, pp. 195–202, Jul. 1992.

(List continued on next page.)

*Primary Examiner*—Dennis-Doon Chow

(57) ABSTRACT

Actual images of actual objects in an object space, taken from a moving perspective of a viewer in the object space and in registration with the actual objects, are provided with retrieved images imitative of stationary or moving "virtual" objects in the object space for providing both actual and retrieved images to the viewer as if the retrieved images were also actual and integrated into the object space. The viewer may move about in the actual object space and physically navigate among the actual objects therein, by means of their images. The viewer may touch and move the objects and may perceive the integrated virtual objects as if real, albeit without substance.

20 Claims, 4 Drawing Sheets

U.S. PATENT DOCUMENTS

| | | | |
|---|---|---|---|
| 4,823,271 A | 4/1989 | Clark et al. | 364/442 |
| 4,982,278 A | 1/1991 | Dahl et al. | 348/53 |
| 5,072,218 A | 12/1991 | Spero et al. | 359/630 |
| 5,130,794 A * | 7/1992 | Ritchey | 348/383 |
| 5,175,616 A | 12/1992 | Milgram et al. | 348/47 |
| 5,252,950 A | 10/1993 | Saunders et al. | 345/9 |
| 5,394,517 A | 2/1995 | Kalawsky | 340/980 |
| 5,423,215 A | 6/1995 | Frankel | 340/980 |

OTHER PUBLICATIONS

M. Gleicher, et al, "Through–the–Lens Camera Control", Computer Graphics (Proc. SIGGRAPH Conf.), pp. 331–340, Chicago IL, Jul. 1992.

P. Wellner, "Digital Desk", *Communications of the ACM*, vol. 36, No. 7, pp. 87–96, Jul 1993.

D. Drascic et al, "ARGOS: A Display System for Augmenting Reality" INTERCHI '93, Apr. 24–29, 1993.

S. Feiner, et al, "Knowledge–Based Augmented Reality", *Comm ACM*, vol. 36, No. 7, pp. 53–62, Jul. 1993.

P. Milgram et al, "Applications of Augmented Reality for Human–Robot Communications", *Proc. IROS '93: Int'l Conf. Intelligent Robots and Systems*, pp. 1,467–1,472, Yokohama, Jul. 1993.

M.W. Siegel, "Image Focusing in Space and Time" 1988 Carnegie Mellon University, pp. 1–11.

S. Gottschalk et al, "Autocalibration for virtual environments tracking hardware", Computer Graphics (Proc. SIGGRAPH Conf. ), pp. 65–72, Aug. 1993.

M. Bajura et al, "Merging Virtual Objects with the Real World: Seeing Ultrasound Imagery within the Patient", Computer Graphics (SIGGRAPH '92 Conf.), vol. 26, No. 2, pp. 203–210, Jul. 1992.

E.K. Edwards, et al, "Video See–through Design for Merging of Real and Virtual Environments", IEEE Virtual Reality Annual International Symposium, Sep. 18–22, 1993, Seattle, Washington, pp. 223–233.

H. Yamaguchi et al "Proposal for A Large Visual Field Display Employing Eye Movement Tracking" The International Society for Optical Engineering Proceedings, Nov. 8–10, 1989, Philadelphia, Pennsylvania, vol. 1194, pp. 13–20.

E.M. Howlett et al, "High–Resolution Inserts in Wide–Angle Head–Mounted Stereoscopic Displays", The International Society for Optical Engineering, Feb. 12–13, 1992, San Jose, California, vol. 1669, pp. 193–203.

* cited by examiner

APPARATUS AND METHOD FOR PROVIDING IMAGES OF REAL AND VIRTUAL OBJECTS IN A HEAD MOUNTED DISPLAY

This application is a continuation of application(s) Ser. No. 08/109,919 filed on Aug. 23, 1993, now abandoned which designated the U.S.

TECHNICAL FIELD

The present invention relates to the presentation of images and, more particularly, to the presentation of successive images.

BACKGROUND ART

Still photography, motion pictures and television were influenced by the way artists represented physical reality in paintings, as if through a window. A highly detailed perspective image is provided, typically within a rectangular frame. All provide highly detailed images which induce the viewer to cooperate with the cameraman's "vision" by assuming the artificial perspective of the representation. The viewer is to some extent enabled to deliberately suspend disbelief that the images themselves are not a real object space. The degree to which the viewer is thus enabled is influenced not only by the image resolution but by the field of view. It is usually thought desirable to increase both. For example, very high resolution commercial television standards have been formulated for increasing image quality. Such approaches typically increase the number of horizontal lines scanned to a number significantly greater than present standards. Larger format movie film such as 70 mm has been used to increase detail. Also, panoramic movies, e.g., "Cinerama" increased the field of view to increase realism. Various stereoscopic television approaches have also been conceived or developed to increase realism.

All of these traditional media take a rather objective view of the physical world. The image is framed by a window through which the viewer can gaze in any direction "into" a representation of an object space. Events are presented in both movies and television in a series of different action scenes in a story line which the viewer can observe from a seemingly quasi-omniscient point of view. The viewer is led to take what appears to be a view of the world as it really is. Yet the choice of image and its perspective is picked by the creator of the image and the viewer actually assumes a passive role.

A sensorama simulator was disclosed by Heilig in U.S. Pat. No. 3,050,870. The senses of an individual were stimulated to simulate an actual experience realistically with images, a breeze, odors, binaural sound and even motion. Heilig also disclosed a stereoscopic television in U.S. Pat. No. 2,955,156. This also was passive.

"Virtual reality," in an electronic image context, goes even further in the direction of increased realism but enables the viewer to take a much more active role in selecting the image and even the perspective. It means allowing a viewer's natural gestures, i.e., head and body movements, by means of a computer, to control the imaged surroundings, as if the viewer were seeing and even moving about in a real environment of seeing, hearing and touching. The object space needs to be modelled in its entirety and the position and gestures of the viewer monitored. As the viewer moves about in the virtual object space, the perspective for viewing the virtual objects must be changed by tranformation of coordinates to correspond to the viewer's position and perspective. This would represent the ultimate in artificial experience if the objects were touchable. The "objects" in such a virtual environment are not real, however, since they are "created" as "virtual objects" in the database or "reality engine."

Due to the myriad of possible actions of the viewer, a corresponding multiplicity of virtual scenarios needs to be available from the reality engine for viewer choice. The creation of many possible scenarios for viewer selection creates a problem of massive demand for image storage space.

There is also the problem of a disconcerting time lag between the viewer's action and the response of the imaging system. These problems make this emerging technology hard to achieve using presently available hardware.

A contact-analog headup display disclosed in U.S. Pat. No. 5,072,218 showed symbolic images superimposed at selected points on a pilot's view of the earth as the aircraft overflies the earth. The position and attitude of the aircraft with respect to the earth and the attitude of the helmet with respect to the aircraft are monitored in order to convert a plurality of stored earth position signals into helmet coordinates. Selected points on earth, such as flightplan waypoints, viewable through the visor of the headup display by the pilot, have symbolic flags planted thereon by means of the display, i.e., the waypoint symbols remain "stuck" on the earth, in the eyes of the pilot, regardless of the attitude of the aircraft and regardless of the attitude of the helmet. The pilot of course can distinguish the unreal symbolic images from the real environment, i.e., the earth.

DISCLOSURE OF INVENTION

The object of the present invention is to provide a new method and means of presenting images in succession.

According to the present invention, "actual" images of actual objects in an object space, taken from a moving perspective of a viewer in the object space, are combined with retrieved images imitative of stationary or moving "virtual" objects in the object space for providing the combined images to the viewer as if the retrieved images were also actual.

The idea is to provide images of the virtual objects such that they are indistinguishable from the images of the actual objects. In other words, the idea is to make it hard to tell the difference or make it difficult to distinguish the real environment from the unreal. Since actual objects in the object space are just re-imaged, from the point of view of the viewer, i.e., the images of the actual objects are in registration with the actual objects, they may be touched, used, navigated around, over and under and even moved about by the viewer without difficulty. Virtual objects may "enter" the imaged object space as if part of the scene and the viewer may interact with these virtual objects according to various alternatives in preprogrammed scenarios.

In further accord with the first aspect of the present invention, an imaging system is provided for use in an object space equipped with prearranged real objects which have their positions and geometric features prestored in a computer spatial model of the object space; the system includes a head mounted display having at least one camera or, alternatively, two cameras for stereoscopic display of images the real objects for a viewer in the object space, wherein the system also includes means for monitoring the position of the head mounted display in the object space and its attitude on the viewer's head with respect to the object space, and wherein, the system further includes virtual object image strorage means for providing images thereof retrieved from an image storage medium and provided on the display, depending on the viewer's movements within the object space, and wherein the retrieved virtual object images are combined with the real object images so as to present an integrated whole. To reduce the imaging burden on the reality engine, most of the image content of the scenario may represent real objects and be obtained from the camera or cameras mounted on the viewer's head. Since the viewer's position and the helmet's attitude in the object space are monitored, the virtual object images may be provided in registered relation to the object space. A seamless integration may be achieved by occluding the portion of the real object images taken up by the virtual object image part retrieved from storage.

The position of the viewer in the object space may be tracked in any number of known methods from the highly sophisticated, such as inertial navigation, to the relatively crude, such as an altimeter in conjunction with floor pressure sensors. The attitude of the head of the viewer may be monitored in a sophisticated manner by means of three-axis gyros or relatively crudely by means of 3-axis inclinometers, for example. It will be understood that other equivalent methods are within the skill of the art.

In still further accord with the present invention, in addition to monitoring the attitude of the head of the viewer with its three rotational degrees of freedom, at least one and preferably two of the three rotational degrees of freedom of at least one of the viewer's eyes are monitored for the purpose of increasing realism by directing most of the computational power of the imaging system at the portion of the image to which the viewer's gaze is directed, which may be in the area of imaging of actual objects or persons or virtual objects or persons.

The present invention, by permitting the reality engine to focus almost exclusively on the imaging of virtual objects, permits a virtual reality that greatly reduces the image storage burden on the reality engine. Furthermore, by imaging a real object space directly, images can be provided almost instantaneously, without the burdensome object space image creation processing and the disconcerting time lag of the prior art disappears. Only the images of virtual objects need to be processed, and since they take up a relatively small role in the total image space, the computational power of the image processing system can be fully utilized to speed up the imaging of the virtual objects. And the real objects may be touched.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
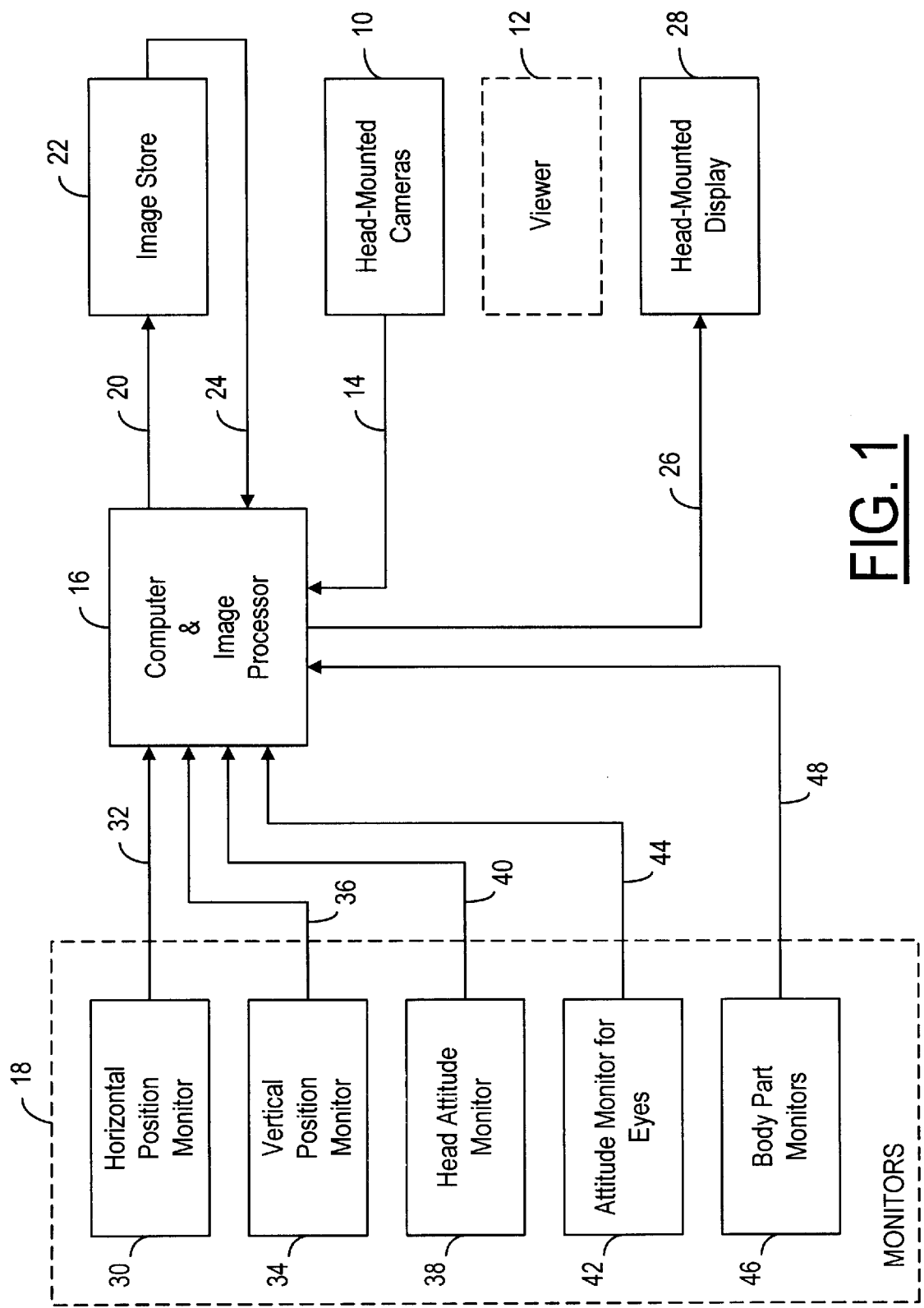
FIG. 1 shows an image processing system, according to the present invention.

FIG. 1 shows an image processing system, according to the present invention, for integrating images of real objects in an object space with images of virtual objects. A pair of head mounted cameras 10, which may be miniature cameras mounted on either side of a viewer's head 12, provide video signals on a line 14 to a computer and image processor 16. The video signals contain image information relating to the real objects imaged by the cameras in the object space.

The computer and image processor 16 has stored within a computer model of the object space and the objects therein. The object space might be a room in a house, for example, and the model might include furniture fixed at various points within the room. Various viewer monitors 18 provide sensed signals indicative of viewer movements within the object space to the computer and image processor 16. The various types of monitors illustrated will be described below but it should be realized that the monitors 18 may include others not shown and may exclude one or more of those shown. In response to the sensed signals, the computer and image processor 16 provides virtual object selection signals on a line 20 to a virtual object image store 22.

The image store 22 contains a large plurality of scenarios, any one or more of which may be selected by the signal on the line 20. Each scenario contains images of one or more virtual objects. The selected scenario is output on a line 24 to the computer and image processor where images of the virtual objects are integrated with the images of the real objects provided on the line 14. The integration process may be carried out, for example, by deliberately failing to image real objects in those portions of the integrated image where virtual objects are to be imaged. This approch is preferred since, otherwise, a superimposition of the two images would result in the viewer perceiving a ghostlike quality for the virtual objects. The integration process may be carried out by software, hardware or a combination thereof, as the case may be. Examples of prior art devices capable of insetting one image into a portion of another image may be found, for example, in U.S. Pat. Nos. 3,576,945, 4,823,271, 4,283,177, 4,246,605, 3,746,782, among others. These are mere examples and many other similar devices capable of the same function can be made by those of ordinary skill in the art of image processing.

An integrated image signal is provided on a line 26 to a head-mounted display worn by the viewer in the object space. The viewer views the integrated images of real and virtual objects as an integrated whole, as if viewing the object space through his own eyes, with the virtual objects appearing equally as real as the real objects, which can be touched and felt, The viewer monitors 18 may include a horizontal position monitor 30 for providing a horizontal position signal on a line 32 to the computer and image processor 16. It may comprise pressure sensors in the floor for sensing the viewer's position on the floor.

A vertical position monitor 34 such as an altimeter may be used to monitor the height of the viewer's head above the floor. A vertical position signal is provided on a line 36 to the computer and image processor.

The functions of the horizontal and vertical position monitors 30, 34 may be carried out by an inertial position sensing system based on accelerometers, gyros, or the like.

A viewer head attitude monitor 38 is provided for monitoring the attitude of the viewer's head. By "attitude" is meant the same concept used in regard to aircraft pitch, roll and yaw. Whereas the monitors 30, 34 monitor translational movements of the viewer in the object space, the head attitude monitor 38 monitors the three rotational degrees of freedom of the viewer's head. A head attitude signal is provided on a line 40 from the head attitude monitor 38 to the computer and image processor 16. The head attitude monitor may be comprised of gyros, inclinometers, or the like.

An attitude monitor 42 for the viewer's eyes may be used to indicate one or more of the three rotational degrees of freedom, i.e., ductions, versions and torsions, of each of the viewer's eyes. Such may include an oculometer or the like. An eye attitude signal is provided on a line 44 to the computer and image processor 16 where it may be used to concentrate the computational power of the image processing system in an area of the integrated imagery currently gazed upon by the viewer.

This may be carried out by means of nonuniform resolution images with a highly detailed portion of the image coinciding with the viewer's visual axis and a lesser detailed portion at the periphery for the viewers peripheral visual field, it may also be carried out by using nonuniform dynamic range. In other words, instead of using more detail for the image portion cast on the viewer's fovea, more gradations of intensity, greyscale, or the like can be dedicated to that portion of the image. Or, for superior results, a combination of increased resolution and dynamic range can be used together in a central image area that tracks the visual axis of the viewer.

One or more viewer body part monitors 46 provide a body part signal on a line 48 to the computer and image processor 16. Such may be a gloves or similar devices such as shown in U.S. Pat. Nos. 5,097,252, 4,988,981, 4,937,444, 4,542, 291. The computer and image processor 16 uses the signal on the line 48 to select or help to select, along with the other sensors 18, the scenario selected from the image store 22.

Figure 2:
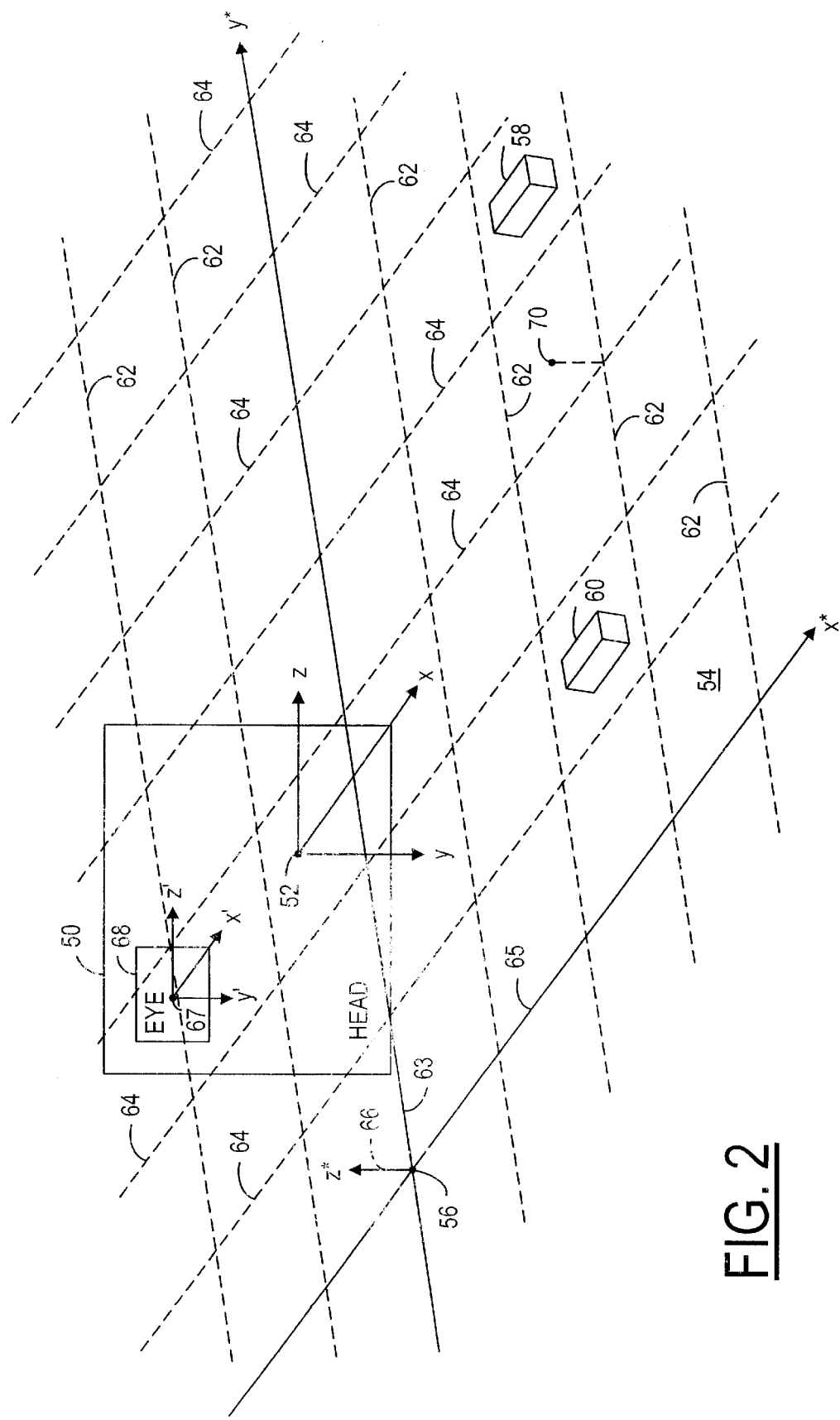
FIG. 2 shows three separate coordinate systems associated with an object space, a viewer's head and the viewer's eye, according to the present invention.

FIG. 2 shows three rectangular coordinate systems in an object space, although other types of coordinate systems may be used as well. A viewer's head 50 is illustrated having a three dimensional x, y, z coordinate system having an origin 52 in relation to a cross-hatched surface 54 having a three dimensional X*, y*, z* coordinate system having an origin 56 and representative of a surface of an object space having actual objects 58, 60 therein wherein a plurality of parallel lines 62 are parallel to an ordinate (y*-axis) 63 of the coordinate system 54 and a plurality of parallel lines 64 are parallel to an abscissa (x*-axis) 65 of the coordinate system 54. A z*-axis 66 is perpendicular to the x*-y* plane and the objects 58, 60 as well as the viewer's head 50 may each be located at different z*-axis heights above the x*-y* plane. The coordinate system 54 represents a ready coordinate reference system by which objects 58, 60, the viewer's head 50, as well as virtual objects may be referenced to each other.

FIG. 2 further illustrates a second coordinate system (x, y, z) fixed in the viewer's head 50 with the origin 52. FIG. 2 also illustrates a third coordinate system (x', y', z') having an origin 67 fixed in an eye 68 of the viewer's head 50. For stereoscopic embodiments of the present invention, two such eye coordinate systems may be used, although only one is shown. The x, y, z head coordinate system is used as a reference for measurements of the attitude of the viewer's head. The x', y', z' eye coordinate system is used as a reference for measurements of the attitude of the viewer's eye.

The viewer 12 of FIG. 1 views the object space of FIG. 2 by means of the head-mounted display 28 of FIG. 1 mounted on the viewer's head 50 as shown in FIG. 2. The display is positioned so that the images of objects 58, 60 provided to the viewer's eye 68 are, from the point of view of the viewer (i.e., from the origin 67), in registration with the objects. Unlike the display of U.S. Pat. No. 5,072,218, where the pilot views the earth with his own eyes and the symbology is superimposed, the viewer of FIG. 1 preferably views the object space by means of images only. Thus, the display apparatus is preferably setup so that the real world is not visible directly but only by means of images. A helmet may be used to mount the display and the camera(s) 10. The camera(s) is(are) positioned as close to the viewer's eyes as possible to reduce parallex effects.

In order to properly position the object space's coordinate system 54 with respect to viewer's head coordinate system as utilized by the head mounted display, according to the present invention, it is useful to conceive of the three separate coordinate systems having the separate origins 56, 52, 67 as freely translating and freely rotating with respect to each other. In fact, the origins 52, 67 will be approximately fixed with regard to translations but viewing them as freely translatable does not complicate the mathematical transformations of coordinates.

With regard to translation, as known in the art of analytic geometry, two coordinate systems having their origins translating out of coincidence can be brought into coincidence by means of a parallel shift.

I.e., if the origin 56 of the object space has coordinates $a_1$, $a_2$, $a_3$ with respect to the origin 52 of the coordinate system in the head 50, then the relations $$x = x^* + a_1$$
$$y = y^* + a_2$$
$$z = z^* + a_3$$

hold between the coordinates x, y, z of a point 70 of space with respect to the head of the viewer and the coordinates x*, y*, z* of point 70 with respect to the object space.

Similarly, as is also known, with regard to rotation, two systems having the same origin, or having their origins brought into coincidence by the above transformation, but having their axes nonaligned, can be brought into alignment using direction cosines or using Euler angles or similar techniques which are or may be equally valid approaches.

In the case of direction cosines, each axis of one system is thought of as making an angle with each axis of the other system. The cosines of these angles are denoted by $a_{ik}$, where i and k run through the values 1, 2 and 3. In the following example, the first index refers to the x, y, z system and the second index to the x*, y*, z* system. The index 1 corresponds to the x- or x*- axis, 2 to the y- or y*-axis and 3 to the z- or z*-axis; that is, $$a_{11} = \cos(x, x^*)\, a_{12} = \cos(x, y^*)\, a_{13} = \cos(x, z^*)$$
$$a_{21} = \cos(y, x^*)\, a_{22} = \cos(y, y^*)\, a_{23} = \cos(y, z^*)$$
$$a_{31} = \cos(z, x^*)\, a_{32} = \cos(z, y^*)\, a_{33} = \cos(z, z^*),$$

where the arguments refer to the angles in the planes formed by the specified axes.

The coordinates of an arbitrary point then transform according to the following equations:

$$x = a_{11} x^* + a_{12} y^* + a_{13} z^*$$
$$y = a_{21} x^* + a_{22} y^* + a_{23} z^*$$
$$z = a_{31} x^* + a_{32} y^* + a_{33} z^*.$$

The $a_{ik}$ are called "direction cosines." The Euler angle or the Euler theorem approach would be similar and will not be described in detail as it will be evident to one skilled in the art of analytic geometry as to how to proceed. Similarly, other methods of transformation are known, including more general methods, and by describing one such method it is certainly not intended to exclude others.

For the special case of the present invention, the head and object space coordinate systems may be viewed as being both translated and rotated with respect to each other at the same time. This case is a combination of the two cases considered above and leads to the following equations of transformation:

$$x = a_1 + a_{11}x^* + a_{12}y^* + a_{13}z^*$$
$$y = a_2 + a_{21}x^* + a_{22}y^* + a_{23}z^*$$
$$z = a_3 + a_{31}x^* + a_{32}y^* + a_{33}z^*.$$

The above equations may be used for a simple head mounted display 28 of FIG. 1 without eye monitoring. However, if it is desired to concentrate the imaging power of the computer and image processor 16 in a small area that tracks the viewer's visual axis, it is necessary to make an additional set of transformations. I.e., if point 52 is the origin of the head and it is desired to further transform to eye coordinates the same point 70 transformed above from object space to head coordinates. If the head's origin is translated to that of the eye by distances $b_1$, $b_2$, $b_3$, and the eye coordinate system is rotated with respect to the head coordinate system as defined by nine direction cosines $b_{ik}$ (defined in a manner similar to that in which the $a_{ik}$ direction cosines were defined), then the coordinates of the point 70 in eye coordinates are:

$$x' = b_1 + b_{11}x + b_{12}y + b_{13}z$$
$$y' = b_2 + b_{21}x + b_{22}y + b_{23}z$$
$$z' = b_3 + b_{31}x + b_{32}y + b_{33}Z,$$

and the designer is then able to provide highly detailed images in a small area, a greater dynamic image range in a small area of the overall image, or both, according to the present invention.

The object space coordinate system expressed in head coordinates may be projected or transformed from the three dimensions of the object space to the two dimensions of the display 28 screen, i.e., a decrease in dimensionality (a dimensionality reduction is not a requirement or limitation, since a projection, for example onto a curved surface might be needed for some applications). This can be thought of as a shadow projection except being a contracted "shadow" rather than the expanded type of everyday experience.

Figure 3:
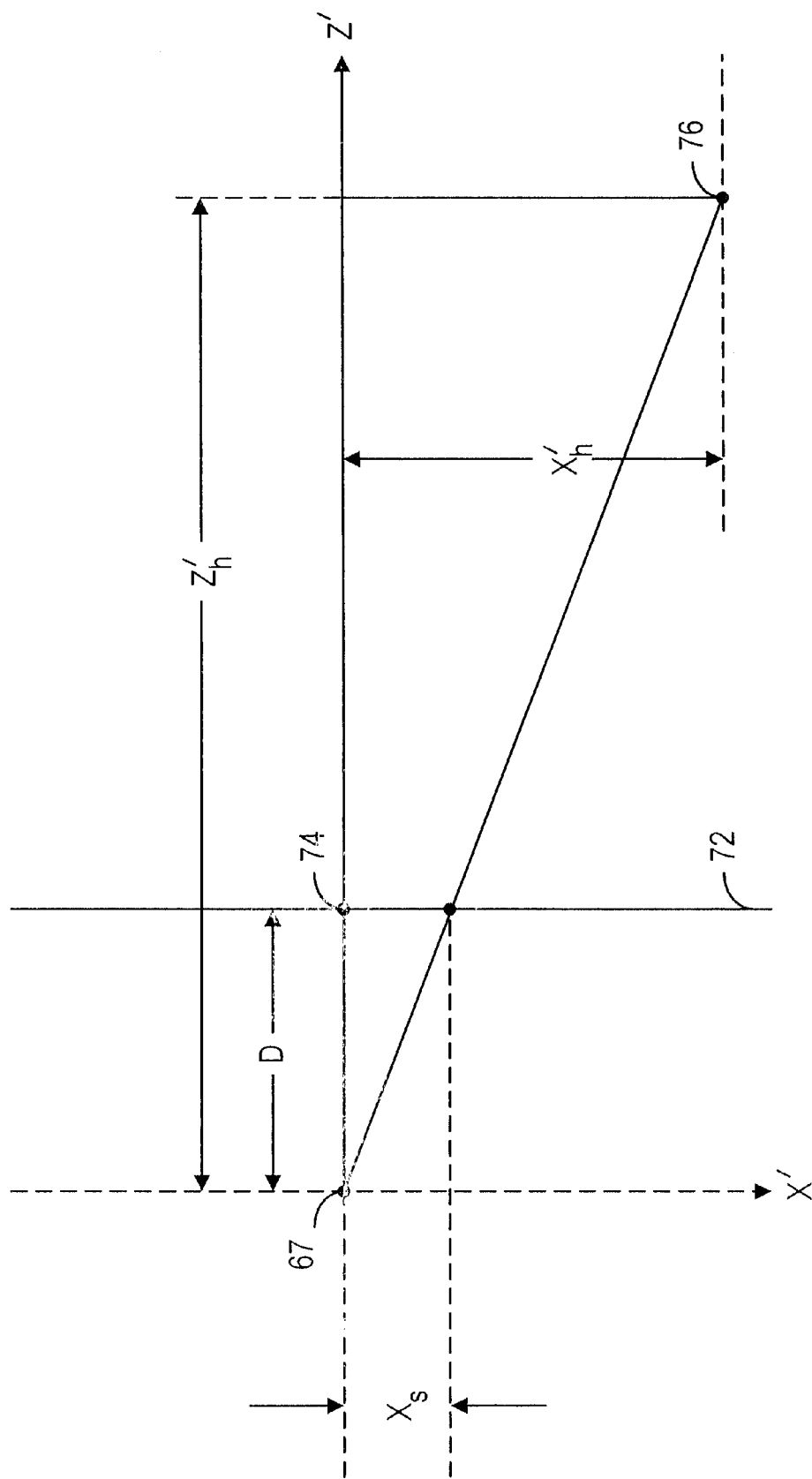
FIG. 3 shows a side view of a head mounted screen for being mounted on the head of the viewer of FIG. 1.

For example, as shown by an edge-on view of a screen 72 in FIG. 3, and not by way of limitation, we can consider an origin 74 of the screen coordinate system to be in the center of the screen 72 with the screen $X_s$- and $y_s$-axes in the plane of the screen parallel to the respective x'- and y'-axes of the eye coordinate system, for example. In that case, the eye z'-axis perpendicularly intersects the screen at its origin 74. The eye's point of view 67 lies on this axis at a distance D behind the screen at a point which may be translated with respect to the origin 52 of the head coordinate system.

Now, consider a point 76 with eye coordinates x',y',z'. (These coordinates may have been generated from object space coordinates using the transformations previously described). FIG. 3 represents the components of this point in the eye system's x'-z'-plane. Applying the well-known laws of similar triangles, it can be seen that if $x_s$ designates the x-component of the point in screen coordinates, $$x_s D = x_h'/z_h',$$

or, solving for $x_s$, $$x_s = D(x_h'/z_h').$$

Similarly, in the eye y'-z'-plane (not shown), $$y_s = D(y_h'/z_h'),$$

where $y_s$ is the y-component of the point in screen coordinates. As in all of the other coordinate transformations described previously, there are other methods of projection and corresponding methods for accomplishing such transformations. In this case, a particular transformation from three-dimensional space to two-dimensional space is illustrated, but it is not by any means intended to exclude such other transformations, projections or methods.

A refinement to the above illustrated approach is to modify the value of D for points near the edges of the screen, to maintain a constant or approximately constant relationship between the linear separation between the two points, in screen coordinates, and their angular separation at the viewer's eye. This may be desirable when the angles subtended at the eye by the screen edges are large.

One may desire to express the screen coordinates in a coordinate system having its origin in the top left corner of the screen, as is usual in the art of computer graphics. This may be effected by a simple translation between the screen coordinate system described above and the corner-originated screen system.

Figure 4:
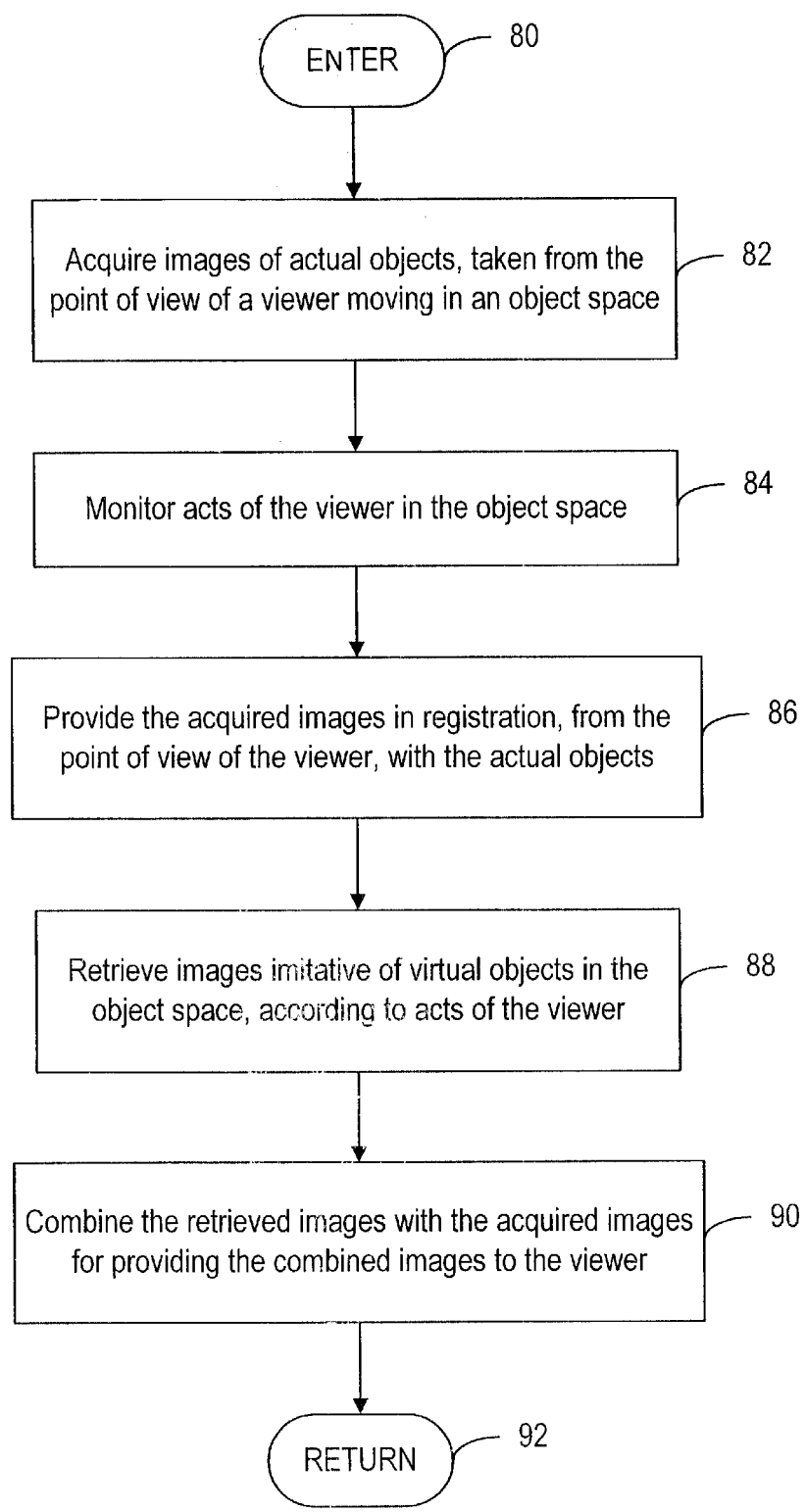
FIG. 4 illustrates a method, according to the present invention, for providing combined images of real and virtual objects to a viewer in a real object space.

FIG. 4 illustrates a method, according to the present invention, for providing virtual reality in a real object space. After entering in a step 80, images of an actual object space, from the point of view of a moving viewer, are acquired in a step 82. Acts of the viewer are monitored, for example by means of the monitors of FIG. 1, in a step 84. The acquired images are provided, in a step 86, to the viewer in registration with the objects in the object space. In a step 88, images of virtual objects are retrieved, according to the acts of the viewer and integrated, in a step 90, with the acquired images for providing the combined images to the viewer. A return is then made in a step 92.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. Apparatus for providing a virtual reality environment with images of virtual objects provided in response to sensed actions of a viewer wherein the images of virtual objects lag after the sensed actions of the viewer, comprising:

a head mounted camera (10) for mounting on a head (12) of the viewer acting as a cameraman for gathering images of real objects from a moving perspective of the viewer, said camera responsive to reflected light from the real objects in an object space, for providing a real object image signal (14) indicative of the real objects;

an image store (22), responsive to a selection signal (20), for providing a prestored virtual object image signal (24) indicative of moving virtual objects;

a computer and image processor (16) having positions and geometric features of said real objects prestored in a computer spatial model of the object space, responsive to a plurality of monitor signals for providing the selection signal (20) and responsive to the real object image signal (14) and the virtual object image signal (24), for providing an integrated image signal (26) indicative of both said real objects and said virtual objects;

one or more monitors (18), responsive to one or more corresponding actions of the viewer acting as a cameraman in the object space, for providing the plurality of monitor signals; and a head mounted display (28) for mounting on the head of the viewer, responsive to the integrated image signal (26), for providing integrated images of the object space with real and virtual objects for viewing by the viewer with the images of the real objects in registration with the real objects from the moving point of view of the viewer and for viewing by the viewer with the images of the virtual objects integrated therewith, wherein the moving virtual objects move with respect to the real objects positioned in the spatial model for interacting with the viewer and whereby the lag of the images of virtual objects after the sensed actions of the viewer is reduced.

2. The apparatus of claim 1, wherein the plurality of viewer monitors (18) includes a horizontal position monitor (30), for providing a horizontal position signal (32).

3. The apparatus of claim 1, wherein the plurality of viewer monitors (18) includes a vertical position monitor (34), for providing a vertical position signal (36).

4. The apparatus of claim 1, wherein the plurality of viewer monitors (18) includes a head attitude monitor (38), for providing a head attitude signal (40).

5. The apparatus of claim 1, wherein the plurality of viewer monitors (18) includes a viewer body part monitor (46), for providing a body part signal (48).

6. The apparatus of claim 1, wherein said one or more monitors include an eye attitude monitor for mounting on the head of the viewer for monitoring an eye of the viewer for providing an eye attitude signal (44) indicative of a direction of a visual axis of the eye of the viewer, for providing the integrated images having nonuniform resolution with a highly detailed portion of each image coinciding with the visual axis of the eye of the viewer.

7. The apparatus of claim 1, wherein said integrated images have a seamless integration of real and virtual objects by occluding real object images taken up by virtual object images retrieved from storage.

8. The apparatus of claim 1, wherein said one or more monitors include an eye attitude monitor for mounting on the head of the viewer for monitoring an eye of the viewer for providing an eye attitude signal (44) indicative of a direction of a visual axis of the eye of the viewer for providing the integrated images having nonuniform resolution with a highly detailed portion of each image coinciding with the visual axis of the eye of the viewer.

9. The apparatus of claim 1, wherein said one or more monitors include an eye attitude monitor for mounting on the head of the viewer for monitoring an eye of the viewer for providing an eye attitude signal (44) indicative of a direction of a visual axis of the eye of the viewer for providing the integrated images having nonuniform resolution with a highly detailed portion of each image coinciding with the visual axis of the eye of the viewer.

10. The apparatus of claim 1, wherein said prestored virtual object image signal is selected by said selection signal from among a plurality of prestored virtual object image signals indicative of a corresponding plurality of alternative preprogrammed scenarios.

11. The apparatus of claim 1, wherein said head mounted camera is a pair of head mounted cameras for mounting on said head of said viewer for gathering said images as stereo images.

12. Apparatus, comprising:

a head mounted camera for mounting on a viewer's head, for acquiring images of actual objects in an object space;

display means for mounting on the viewer's head for providing the images of actual objects in the object space, taken from a moving perspective of the viewer in the object space, wherein the display means is for providing the images of the actual objects for viewing by the viewer, from the viewer's point of view, in registration with the actual objects and in substitution therefor; and an image processor, having positions and geometric features of said actual objects prestored in a spatial model of the object space, for combining the images of actual objects with retrieved images selected from among a plurality of prestored virtual objects in the object space according to monitored head movements of the viewer, for providing the combined images to the viewer for enabling the viewer to perceive the object space with both actual and virtual objects by means of the combined images and wherein the virtual objects move with respect to the actual objects for interacting with the viewer.

13. The apparatus of claim 12, wherein said head mounted camera is a pair of head mounted cameras for mounting on said viewer's head for acquiring stereo images of said actual objects.

14. The apparatus of claim 13, wherein said one or more monitors include an eye attitude monitor for mounting on the head of the viewer for monitoring an eye of the viewer for providing an eye attitude signal (44) indicative of a direction of a visual axis of the eye of the viewer, for providing the integrated images having nonuniform resolution with a highly detailed portion of each image coinciding with the visual axis of the eye of the viewer.

15. The apparatus of claim 12, wherein said retrieved images are selected from among said plurality of prestored virtual objects indicative of a corresponding plurality of alternative preprogrammed scenarios.

16. A method, comprising the steps of:

monitoring position and attitude of a head of a viewer as the viewer moves about in an object space;

acquiring images, taken from a moving point of view of the head of the viewer in the object space, of actual objects in the object space, said actual objects having positions and geometric features prestored in a computer model of the object space;

providing the images of actual objects in the object space, in registration, from the moving point of view of the viewer, with the actual objects for viewing by the viewer as substitutes for viewing the real objects;

retrieving from among a plurality of prestored images of virtual objects, selected prestored images of virtual objects imitative of actual objects moving in the object space, said selected prestored images selected according to the monitored position and attitude of the head of the viewer; and combining the retrieved images of virtual objects imitative of actual objects moving in the object space with respect to the positions and geometric features of the actual objects as substituted by the images of actual objects in the object space, for providing combined images for viewing by the viewer for enabling the viewer to perceive the object space by means of the combined images as if the retrieved images were also actual and integrated within the object space.

17. The method of claim 16, wherein said step of acquiring images comprises the step of acquiring stereo pairs of images from said moving point of view.

18. The method of claim 17, further comprising the step of:

monitoring direction of a visual axis of an eye of the viewer, for providing the combined images having nonuniform resolution with a highly detailed portion of each image coinciding with the visual axis of the eye of the viewer.

19. The method of claim 16, further comprising the step of:

monitoring direction of a visual axis of an eye of the viewer, for providing the combined images having nonuniform resolution with a highly detailed portion of each image coinciding with the visual axis of the eye of the viewer.

20. The method of claim 16, wherein said prestored images of virtual objects are selected from among a plurality of alternative scenarios.

* * * * *